May 16, 1961  W. K. LAWSON  2,984,442
CONDUIT FASTENER
Filed April 2, 1958
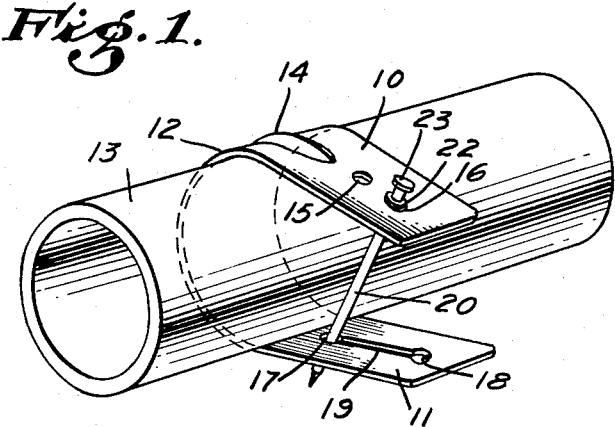
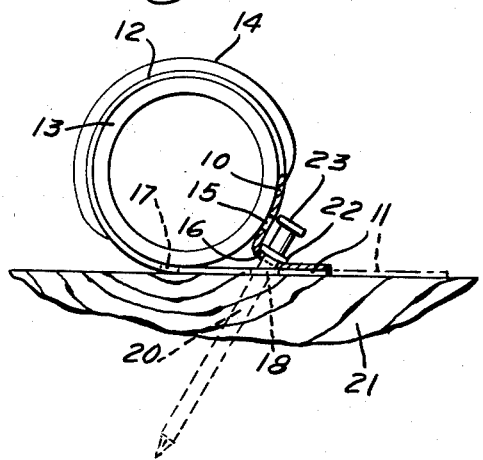
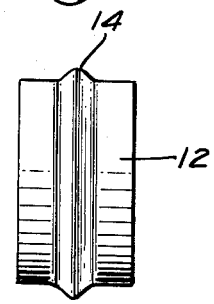
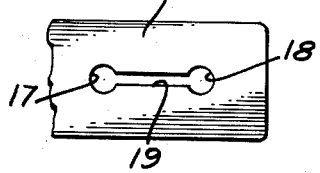
WILLIAM K. LAWSON,
INVENTOR.
WHANN & McMANIGAL
Attorneys for Applicant

United States Patent Office 2,984,442
Patented May 16, 1961

2,984,442
CONDUIT FASTENER
William K. Lawson, 16410 Doublegrove, La Puente, Calif.
Filed Apr. 2, 1958, Ser. No. 725,996
2 Claims. (Cl. 248—74)

The present invention relates generally to fastening devices, and is more particularly concerned with conduit fasteners in the form of a clamping strap which is especially useful in the electrical trade for securing tubular conduits in anchored position against a supporting frame structure such as a wooden joist, wall, etc.

Heretofore it has been rather general practice in installing electrical metallic tubing to utilize U clamps, so-called plumbers tape and other prefabricated members.

In general, these presently known devices necessitate the use of two fastening screws or nails in order to hold the conduit or electrical tubing in position. Moreover, these devices do not as a general rule fixedly and securely retain the conduit or tubing in the installed position.

It is one object of the present invention to provide an improved conduit fastener which is simple and inexpensive of construction, and which utilizes a single securing member, and operates in such a manner that the fastener will be drawn into tight gripping relation with the conduit or tubing, and which is so arranged that it will fixedly and rigidly hold the conduit or tubing in mounted position.

A further object of the invention is to provide a conduit fastening device of such character that it may be used with several different sizes of conduit or tubing.

Still another object is to provide a holding device of this character which utilizes a double-headed driving member, and which facilities installation.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a perspective view of a conduit fastener embodying the features of the present invention, and showing the fastener as initially applied to the conduit;

Fig. 2 is an elevational view of the fastener as seen when facing the curved portion thereof;

Fig. 3 is a fragmentary plan view of one end of the fastener, showing certain details of construction; and Fig. 4 is a side view showing the fastener in its final position of securement on the conduit.

Referring now to the drawings, for illustrative purposes, the conduit fastener of the present invention is disclosed as being preformed from a suitable strap material, preferably a suitable metal, so as to comprise substantially flat end portions 10 and 11. These end portions are interconnected by a curved portion 12 adapted to substantially conform to the surface of the conduit or tubing 13 with which the fastener is associated. The curved portion is rigidified by a longitudinally extending rib 14 which is formed by deforming the strap material.

With this construction, it will be appreciated that the rigidified curved portion will remain substantially as preformed during the affixing of the fastener to the conduit. The end portions 10 and 11 being retained in substantially flat condition may be comparatively easily flexed so as to be brought into more intimate association with the conduit and thereby more effectively retain the conduit in mounted position.

The means utilized to mount the fastener and effect a tight gripping relationship with the conduit, will now be described. As shown particularly in Fig. 1, the end portion 10 is illustrated as having a plurality of holes 15 and 16 which are longiutdinally spaced along the axis of the end portion 10. As shown in Figs. 1 and 3, the end portion 11 is provided with spaced openings 17 and 18, these openings being similarly spaced apart in a direction longitudinally of the end portion. The openings 17 and 18 are interconnected by a line wherein the strap material has been weakened. In the present instance, this weakening is accomplished by providing a connecting narrow slot 19 which is of less width than the diameter of either of the openings 17 or 18. While the weakened portion has been shown as a slot, in this case, it is within the concept of the present invention to weaken the material by other means as well, for example, by providing a line of small spaced openings, thinning of the material, or a scored line.

For securing the fastener in position, a single elongate member 20 such as a nail which may be positioned in a manner hereafter explained and driven into a support 21 such as a wooden joist, studding, wooden panel or other constructional member. The nail is shown as comprising a double-head structure embodying an enlarged inner head portion 22 and an outwardly spaced end head portion 23. Since this is a member which is adapted to be driven, the provision of a double-head materially improves the installation of the fastener device and assures a tight gripping relationship between the fastener and the conduit with which it is associated, as will subsequently be explained more fully.

The provision of the two holes 15 and 16 in the end portion 10 permit the use of a particular fastener with two sizes of conduit. For the smaller conduit the member 20 is positioned in the hole 15, while for the larger size conduit, the member 20 is positioned in the hole 16. Irrespective of which hole is utilized, the member 20 is initially positioned in opening 17 of the end portion 11. To complete the installation, the member 20 is now driven into the support 21. During this operation, it will be observed that the inner head portion bears against the flat end portion 10, and as the member 20 is further driven in, the end portion 10 will be drawn around the adjacent surface of the conduit into intimate contact therewith. As the driving continues, the end portion 11 will be pulled toward the left as indicated by dotted lines in Fig. 4. The member 20 will be forced from the opening 17 and there will be relative movement therof through the slot 19 to a final position wherein the member 20 will be disposed in the opening 18 or substantially therein, the member 20 during its movement through the slot 19 acting to deform the side portions thereof so that in the final position, if the member 20 is still in the slot portion, there will be a holding action between the member 20 and the slot edges.

The utilization of the double-headed member 20 places the outermost head 23 in a position which conveniently permits the member 20 to be driven to its final securing position. This would be more difficult if a single-headed member were used.

From the foregoing, it is believed clear that the invention accomplishes the objects mentioned at the outset, and that the fastener in final position intimately grips and efficiently anchors the conduit with which it is associated.

Various modifications may suggest themselves to those skilled in the art without departing from the spirit of my invention, and, hence, I do not wish to be restricted to the specific form shown or uses mentioned, except to the extent indicated in the appended claims.

I claim:

1. A device of the class described, comprising: a relatively thin metallic strap adapted to initially extend around an object to be anchored on a surface, and have its ends in spaced apart relation outwardly away from said surface, the outermost one of said ends with respect to said surface having a hole therein and the innermost other of said ends with respect to said surface having a pair of openings spaced longitudinally of said associated strap end, said openings being interconnected by a narrow slot, such hole and openings being such that upon driving an elongate fastening member positioned in said hole and the innermost of said openings, said one end will be drawn tightly over the object, and the other end will be pulled and shifted lengthwise until the fastening device has relatively shifted along said slot to a final position therein and the said one end is in engagement with said other end.

2. A device of the character described, comprising: a relatively thin metallic strap adapted to initially extend around an object to be anchored on a surface, and have its ends in spaced apart relation outwardly away from said surface, the outermost one of said ends with respect to said surface having a hole therein and the innermost other of said ends with respect to said surface having a narrow longitudinally extending axial slot; and a double-headed securing member having an inner head and outer head and a driving end of greater diameter than the width of said slot, said securing member being adapted to be positioned in said hole with its driving end in an inner end portion of said slot, and driven by driving means therethrough, whereby the inner head acts initially to draw said one end tightly over the object, and pull the other end lengthwise to relatively force the fastening device along said slot until a final fastening position is reached in which the inner head forces the said one end into clamped holding engagement with said other end, the outer head of the fastening device during its movement from said initial to final fastening position projecting outwardly to a position where it may be engaged by the driving means.

References Cited in the file of this patent

UNITED STATES PATENTS

| | | |
|---|---|---|
| 359,310 | Axt | Mar. 15, 1887 |
| 1,600,224 | Grundy | Sept. 21, 1926 |
| 2,071,219 | Reis | Feb. 16, 1937 |
| 2,338,754 | Bonas | Jan. 11, 1944 |
| 2,503,327 | Fields | Apr. 11, 1950 |

FOREIGN PATENTS

| | | |
|---|---|---|
| 508,805 | Germany | Oct 2, 1930 |